United States Patent

Woodward et al.

[11] Patent Number: 5,680,956
[45] Date of Patent: Oct. 28, 1997

[54] PIZZA PAN AND METHOD

[75] Inventors: Steve Woodward; Patricia Scheibmeir; Deborah McDaniel; Valerie Proctor, all of Wichita, Kans.

[73] Assignee: Pizza Hut, Inc., Wichita, Kans.

[21] Appl. No.: 406,313

[22] Filed: Mar. 17, 1995

[51] Int. Cl.⁶ .................. A21B 3/13; A21D 8/00
[52] U.S. Cl. .................. 220/607; 99/432; 99/450; 99/DIG. 15
[58] Field of Search .................. 220/607; D7/369, D7/667, 325; 99/450, 432, DIG. 15; 426/505, 523, 113, 128

[56] References Cited

U.S. PATENT DOCUMENTS

| | | |
|---|---|---|
| 833,566 | 10/1906 | Walker . |
| 955,033 | 4/1910 | Wing . |
| 1,021,640 | 3/1912 | Steidler . |
| 1,493,796 | 5/1924 | Anderson .................. 249/136 |
| 1,747,832 | 2/1930 | Hurxthal . |
| 2,111,021 | 3/1938 | Bemis . |
| 2,145,263 | 1/1939 | Huntzinger et al. . |
| 3,453,948 | 7/1969 | Murphy . |
| 3,716,319 | 2/1973 | Norman . |
| 3,861,576 | 1/1975 | Tolaas et al. . |
| 3,864,071 | 2/1975 | La Monica . |
| 4,065,583 | 12/1977 | Ahlgren .................. 426/243 |
| 4,176,591 | 12/1979 | Power . |
| 4,367,243 | 1/1983 | Brummett et al. . |
| 4,563,946 | 1/1986 | Barlow et al. . |
| 4,676,151 | 6/1987 | Gorsuch et al. .................. 426/505 |
| 4,677,905 | 7/1987 | Johnson . |
| 4,749,581 | 6/1988 | Gorsuch et al. . |
| 4,927,991 | 5/1990 | Wendt et al. . |
| 4,970,358 | 11/1990 | Brandberg et al. . |
| 5,076,434 | 12/1991 | Hoffman, Jr. .................. 206/509 |
| 5,097,753 | 3/1992 | Naft .................. 99/341 |
| 5,175,031 | 12/1992 | Ochocki . |
| 5,199,347 | 4/1993 | Chen . |
| 5,202,138 | 4/1993 | Stypula .................. 426/94 |
| 5,206,045 | 4/1993 | Stuck . |
| 5,215,775 | 6/1993 | Hoffman, Jr. .................. 426/418 |
| 5,503,063 | 4/1996 | Sebald . |
| 5,520,096 | 5/1996 | Dornbush et al. . |
| 5,523,104 | 6/1996 | Kirk . |

FOREIGN PATENT DOCUMENTS

| 22003 | 4/1916 | Denmark .................. 99/450 |
|---|---|---|
| 2998 | 2/1900 | United Kingdom .................. 99/450 |

OTHER PUBLICATIONS

Ekco Pan Brochure and Sample.

*Primary Examiner*—Allan N. Shoap
*Assistant Examiner*—Niki M. Kopsidas
*Attorney, Agent, or Firm*—Patterson & Keough, P.A.

[57] ABSTRACT

A pizza pan receives and bakes a pizza to produce a hearth-baked texture and appearance. The pizza pan comprises a base with a plurality of perforations therethrough, the perforations being disposed in first and second perforation regions. The perforation density in the first region, disposed toward the center of the pan, is greater than the perforation density of the second region, disposed toward the outside of the pan, to allow greater transmission of heat to the center of the pizza. A continuous, non-perforated rim extends circumferentially around the base of the pan to form an obtuse angle of intersection therewith. The pan evenly transmits baking heat through the base to the food product being prepared, resulting in consistent texture, appearance and doneness throughout the entire product.

19 Claims, 5 Drawing Sheets

Fig. 6a 0.119 HOLES ON .25 INCH CENTERS   DENSE AREA

IN ONE SQUARE INCH OF METAL AREA:

9 FULL CIRCLES
  6 (12 HALF CIRCLES)
  1 (4 QUARTER CIRCLES)
16 TOTAL PERFORATED HOLES AREA PER HOLE: $\pi r^2 = \pi \left(\frac{.119}{2}\right)^2 = .011122\ in^2$ DENSE AREA  16 HOLES × .011122 $in^2$/HOLE = 0.178 (17.8%)

Fig. 6b 0.119 HOLES ON .5 INCH CENTERS BAND

IN ONE SQUARE INCH OF METAL AREA:

1 FULL CIRCLE
2 (4 HALF CIRCLES)
1 (4 QUARTER CIRCLES)
4 TOTAL PERFORATED HOLES

AREA PER HOLE: .01122 $in^2$ (CALCULATED ABOVE)
BAND AREA  4 HOLES × .011122 $in^2$/HOLE = .0445 (4.45%)

PIZZA PAN AND METHOD

BACKGROUND OF THE INVENTION

1. Field of the Invention

The invention relates to utensils for cooking food items, and more particularly, to pans adapted for cooking pizza and similar baked products.

2. Description of Related Art

Pizza is one of the most popular food items in the United States and abroad. Pizzas come in almost every imaginable size and shape, with virtually unlimited variation in the types of toppings, meats, vegetables, cheeses, doughs/crusts and other ingredients used. Pizza makers select and assemble these ingredients to create a taste, aroma, texture, and consistency in accordance with the desires of their selected tasting audience. Pizza crust, for example, comes in a number of thicknesses and types, to create thin pizza, pan pizza, and filled-rim pizza, as disclosed in commonly assigned, concurrently filed, copending U.S. patent application No. 08/406,311 to Scheibmeir et al. (Attorney Docket No. 1441.07-US-01), entitled Filled Rim Pizza and Improved Method of Pizza Production, which is incorporated herein by reference.

Commercial pizza manufacturers with national and international distribution, especially pizza restaurants, typically select, develop and promote a number of different pizzas, typically varying at least in the type of crust and the number and types of toppings. Within each pizza type, however, consistency is desired, from pizza to pizza and from restaurant to restaurant. National pizza restaurant chains want to develop the notion that customers can get their favorite pizza, consistently cooked to perfection, at any of the chain's restaurants anywhere in the nation, or, for that matter, the world.

A problem arises, however, in that the restaurants of many national chains are individually owned, and the individual owners select, within certain parameters, different ovens and other devices that affect the baking environment. Different types of ovens, for example, use different fans, thermostats and other heat regulation devices and consequently produce different temperatures and heat flow patterns. Oven size, airflow within the oven, outside temperature, humidity and other environmental conditions, also affect heat distribution. Even identical ovens with identical controls and baking volumes are subject to variation in temperature and heat flow, due to manufacturing tolerances and differing calibrations. It becomes very difficult for national pizza chains, therefore, to ensure that restaurants throughout the chain produce pizzas that look, feel and taste the same from restaurant to restaurant.

The problem is exacerbated in that a number of variables affect the look, feel and taste of a pizza as perceived by a customer. The texture of the pizza, for example, is very significant. Many customers desire a "hearth-baked" texture, that is, the texture that would be produced by baking a pizza on an open stone hearth. Such a pizza is placed directly on the stone to bake, and at the end of the baking process is of uniform coloration and texture. Uniform crispness is another variable affecting customer perception. The amount of moisture in the crust significantly affects its crispness; allowing too much moisture to remain after baking causes a flabby, soggy, undesirable product. Further, unless the moisture of the crust is uniform, alternating areas of crispness and sogginess result, which also is very undesirable. Overall consistency and appearance of the pizza, from top to bottom and side to side, is also very important. Because these and other variables all are affected differently and to varying degrees by the various types of ovens and other equipment used from restaurant to restaurant, as well as by variations in temperature, etc. within individual and/or identical ovens, achieving uniformity of all the products served throughout the chain is all the more complicated.

The problem is further heightened with filled-rim pizza of the type disclosed in the above-identified copending U.S. patent application. The added thickness of the crust and varying composition of the pizza present unique baking challenges. Baking heat must thoroughly penetrate the center of the pizza and the outer, filled-rim, without scorching either. If too little heat is applied to the filled-rim portion, on the other hand, the cheese or other type of stuffing present within the crust will not melt uniformly or to a sufficient extent.

Perforated pans are known in the art for baking food products such as pizza. U.S. Pat. No. 4,176,591 to Power, for example, which is incorporated herein by reference, discloses a pan with a plurality of perforations uniformly distributed over the entire base surface of the pan. By exposing a substantial portion of the lower dough surface of the pizza to the heat of the oven, a perforated pan shortens the baking time, produces relatively rapid elimination of moisture from the dough, which reduces separation and bubbling effects in the dough, and reduces sticking of the dough to the baking surface of the pan. Pans of the type disclosed in Power, however, have a number of disadvantages. Pizza products baked in the Power pan tend to come out of the oven with a splotchy, spotty appearance, caused by overdarkening or scorching at the perforations. Additionally, the perforations and spacings between the perforations in Power are too large, resulting in well baked or even overbaked crust portions interspersed with unbaked or underbaked portions. Additionally, pans with perforations of uniform distribution throughout the surface of the pan tend to overbake the edges of the pizza, potentially scorching the crust. Alternatively, if baking is sufficient for the edge portions of the crust, the central section of the pizza tends to be underbaked.

In an attempt to address these latter problems, U.S. Pat. No. 4,563,946 to Barlow et al., which is incorporated herein by reference, discloses a pan having a perforated central section surrounded by a solid, non-perforated periphery. Although the solid periphery reduces the amount of heat applied to the dough at the edge of the pizza, relative to periphery of the Power reference, the solid periphery of Barlow et al. tends to fail to allow sufficient heat to reach the dough at the edge of the pizza to sufficiently bake a stuffed or other type crust. Thus, non-uniform baking and coloration result, as well as uneven melting of the cheese supported by the dough. Additionally, the Barlow et al. pan fails to allow the air movement required to withdraw moisture from the bottom crust along the outer edges of the pizza, since perforations are absent.

Similarly, U.S. Pat. No. 4,676,151 to Gorsuch et al., which is incorporated herein by reference, also discloses a pan having a solid, non-perforated periphery, along with a central section perforated in a "starburst" pattern. Gorsuch et al. specifically avoided placing perforations at the periphery, stating that if holes were provided in the entire bottom area of the pan, baking of the pizza would not be uniform and the sides of the pizza would be baked prior to the baking of the entire portion, resulting in overbaked sides of the pizza. Unfortunately, however, Gorsuch et al. suffers a great disadvantage with respect to pizzas having a filled rim, because, like Barlow et al., the solid periphery fails to allow sufficient heat to reach the dough at the edge of the pizza to bake a stuffed or other type crust sufficiently. Additionally, regardless of the type of crust, the starburst pattern fails to distribute baking heat in a uniform manner, resulting in uneven coloration and/or baking and possibly in alternating limp and crisp portions.

The perforated pans of the prior art also suffer from other disadvantages, not only with respect to filled-rim pizzas but also with respect to other types of pizzas. None of the prior art pans are able to provide the sought-after hearth-baked texture and consistency described above, because the perforation densities and percentages of open areas are inadequately high and/or low across the pan. Additionally, the perforations of many prior art pans are too large or too small relative to pan thickness and diameter, resulting in sagging/pressing of the dough into the perforations, visible spottiness on the bottom of the cooked crust, inadequate elimination of moisture from the dough, resulting in soggy/flimsy crust and separation and bubbling within the dough, elevated baking times and unnecessary energy use, uneven browning and cheese-melting at the top of the pizza during baking, and even reduced pan strength.

Further, neither the perforated nor non-perforated pans of the prior art are able adequately to accomplish the uniformity of results desired from restaurant to restaurant and oven to oven, as described above.

SUMMARY OF THE INVENTION

To solve the above and other problems, a pan according to the invention includes at least two regions of perforations extending through the base of the pan. In a first, outer region, the perforations are more widely spaced and consequently are of lesser perforation density than in a central, inner region, in which the perforations are more densely spaced. These perforation densities are selected to cause uniform application of cooking heat through the bottom of the pan to the food product being prepared, resulting in consistent texture, appearance and doneness throughout the entire product.

BRIEF DESCRIPTION OF THE DRAWINGS

The preferred embodiments are described with reference to the drawings, in which like reference numerals denote like elements throughout the figures, and in which.

DETAILED DESCRIPTION OF PREFERRED EMBODIMENTS

According to a preferred embodiment, a cooking utensil in the form of a pan is designed for baking pizza-type food products. The pan according to the invention, however, is not limited to use with pizza-type products. The pan has wide application for use in cooking other foods, including pies, cookies, pastries, and numerous other food products. Thus, while preferred embodiments of the invention will be described with respect to pizza-type products, the invention is not limited to these embodiments.

FIGS. 1–4 illustrate a preferred embodiment of a pan according to the invention. Pan 10 includes a base 13 having a top surface 17, bottom surface 18, and an outer rim 15 preferably disposed at an obtuse angle with respect to base 13. In a preferred embodiment, rim 15 extends at approximately a 52° angle with respect to base 13, but of course, other angles are contemplated for and are within the scope of the invention to produce desirable results with respect to different food products, for example.

Rim 15 extends circumferentially around the entire extent of pan 10 and includes an outer surface 23 and an inner surface 25, separated by a top edge 20. The top edge 20 of rim 15 preferably is at a height of 0.70 inches above the bottom surface 18 of pan 10. This preferred height has been found to produce the most advantageous air and heat flow characteristics around the edge of the pan to the edge of the pizza. But of course other heights are contemplated by the invention to produce the most desirable results, depending upon the particular type of pizza or other product being cooked, for example. Rim 15 also is designed for easy gripping by gripper handling devices common in many commercial restaurants, as described below.

Figure 1:
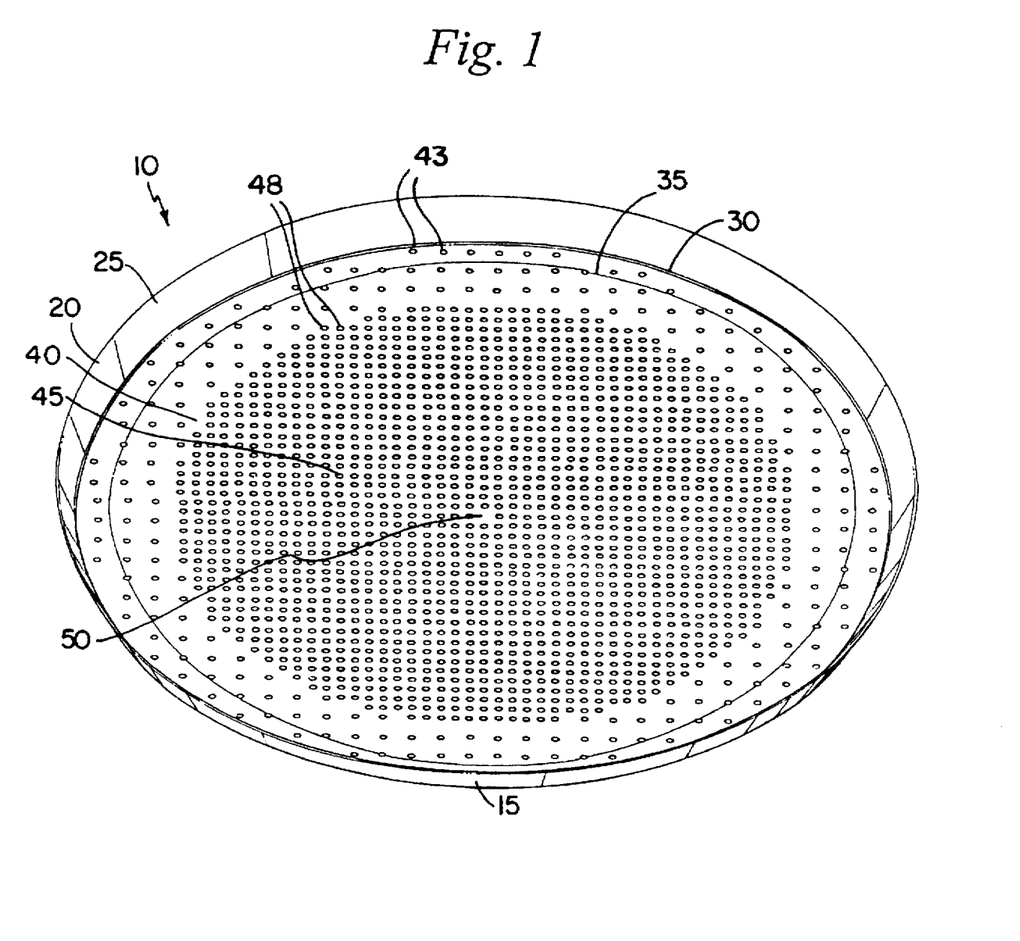
FIG. 1 is a perspective view of a pan according to a preferred embodiment of the invention.
Figure 2:
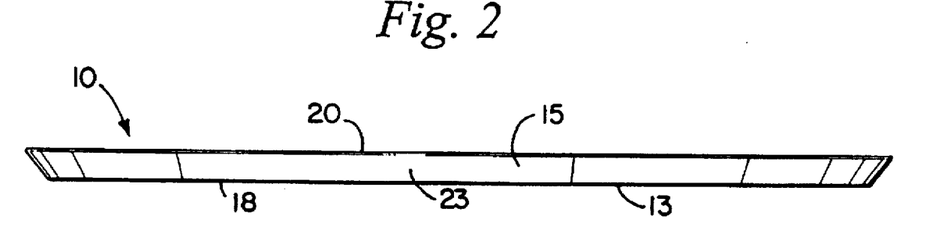
FIG. 2 is a side elevational view of the FIG. 1 pan.
Figure 3:
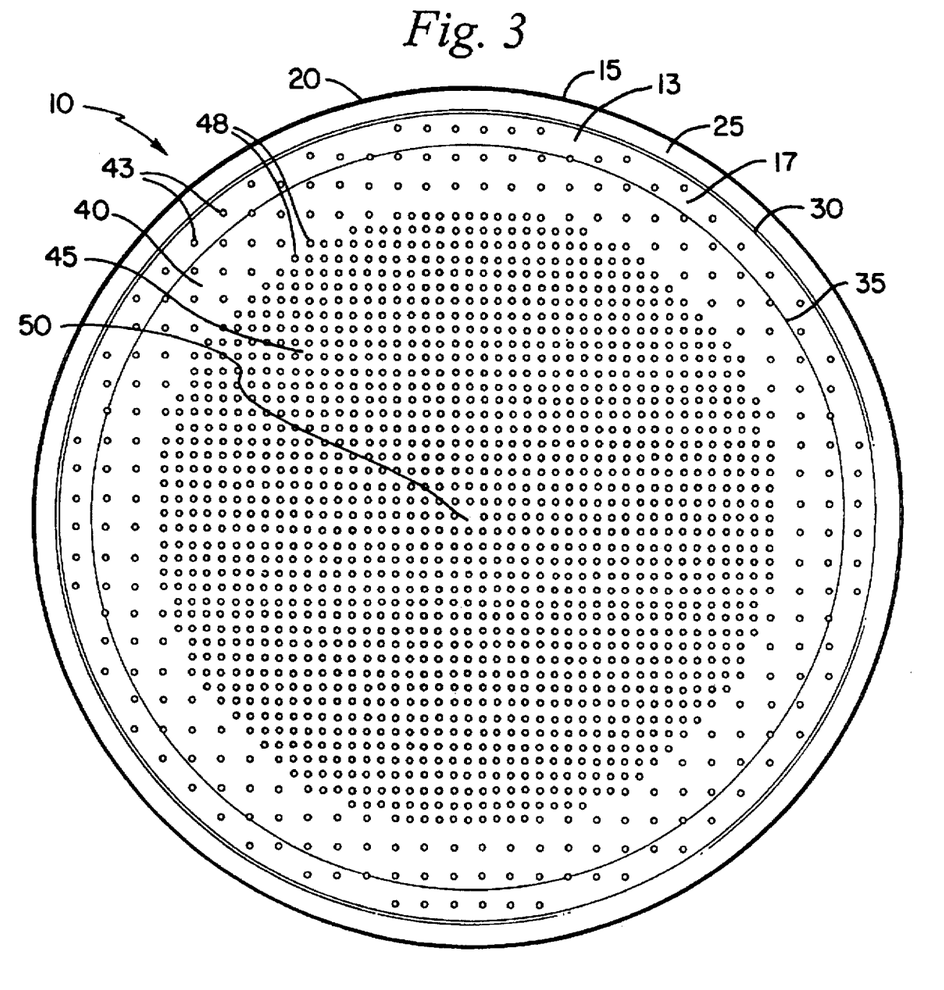
FIG. 3 is a top view of the FIG. 1 pan.
Figure 4:
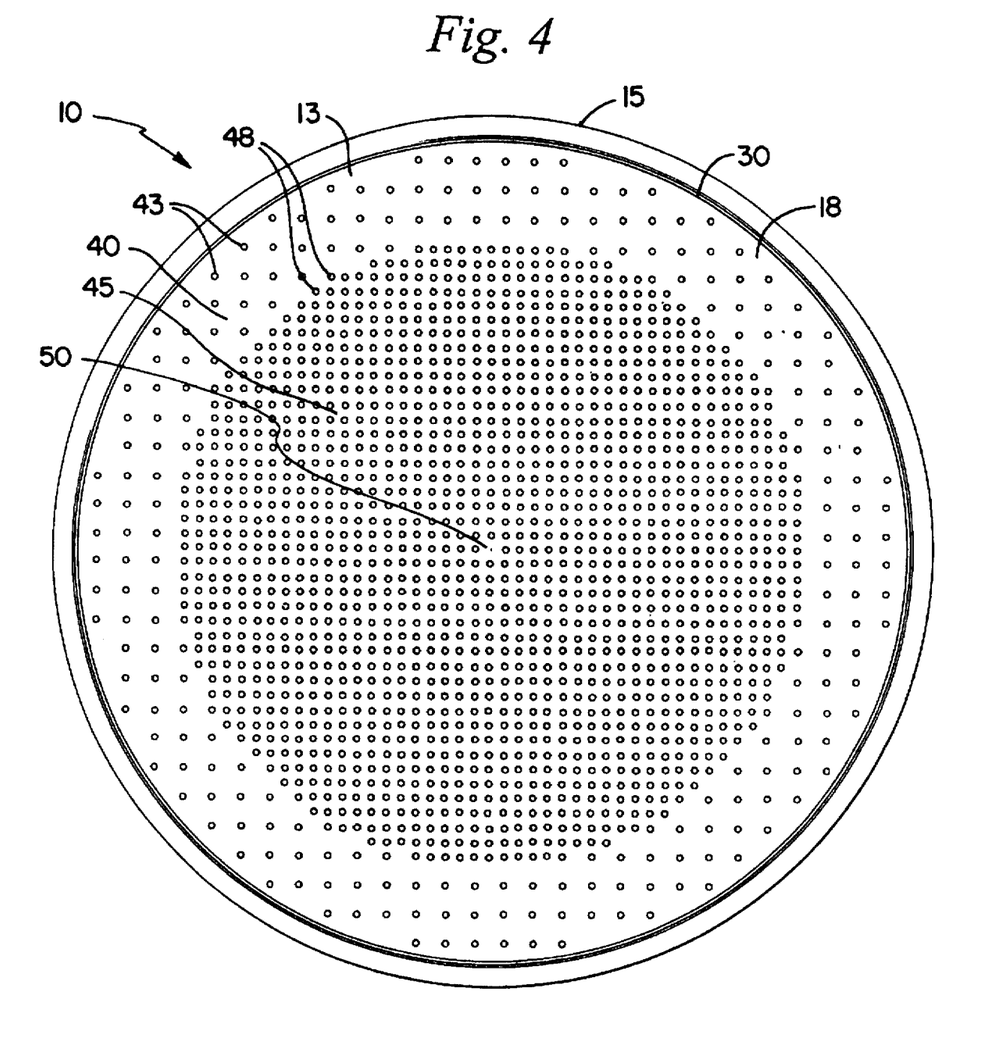
FIG. 4 is a bottom view of the FIG. 1 pan.
Figures 5A, 5B, 5C:
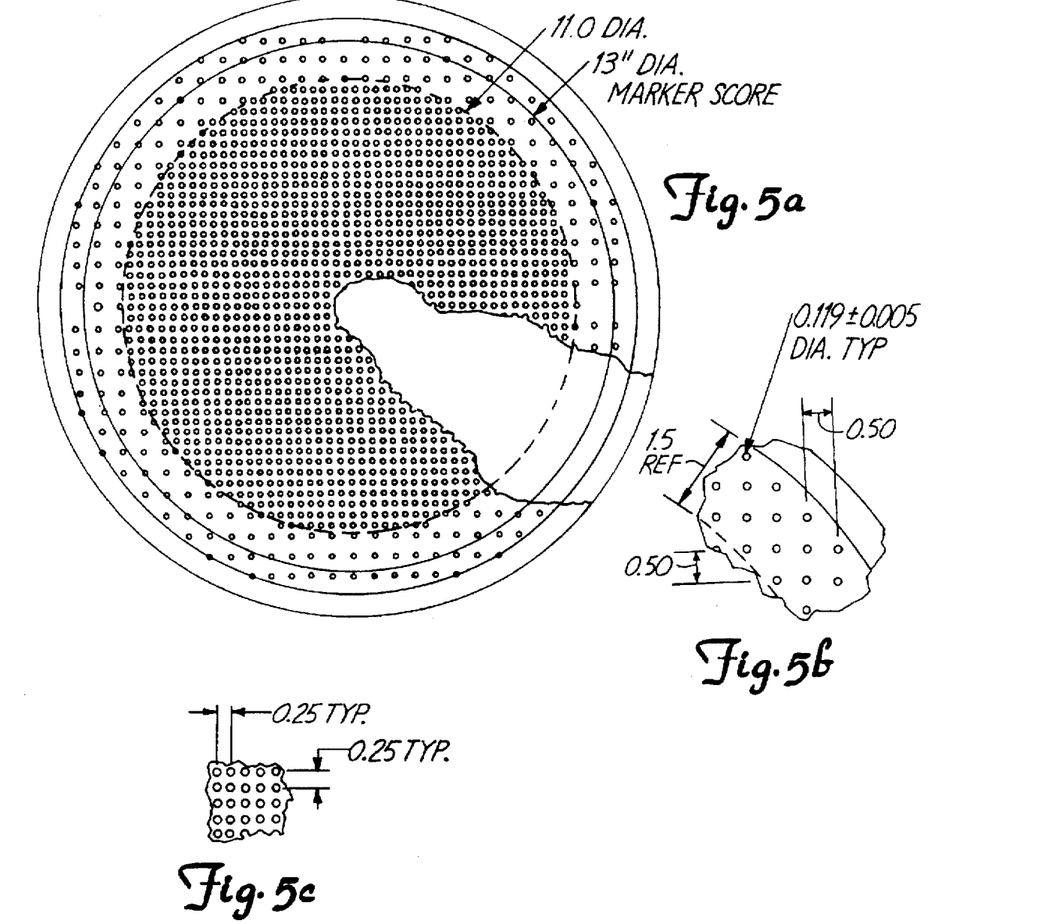
FIGS. 5A–5D are top, first and second detail, and side views of the FIG. 1 pan.
Figure 5D:
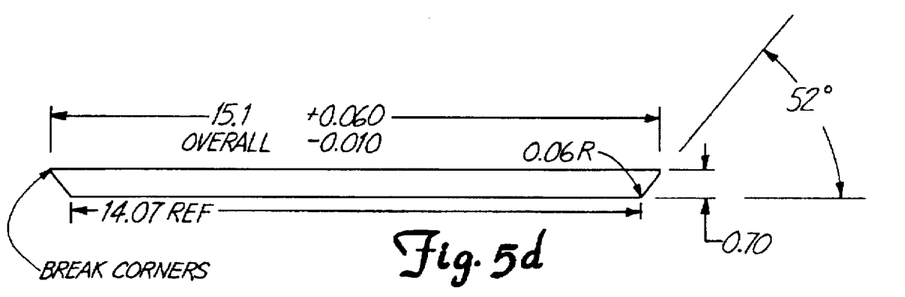

Base 13 of pan 10 preferably is flat and includes a plurality of perforations 43, 48, disposed in two distinct regions 40, 45. Perforations 43 within outer region 40 are spaced farther apart than are perforations 48 of central region 45, as best shown in FIGS. 1, 3 and 4. Central region 45 includes axis region 50, which in the illustrated embodiment does not include a central hole, in accordance with ease-of-tooling requirements for the equipment used to produce the perforations in pan 10. In another embodiment, however, axis region 50 includes a central hole.

The outer periphery of region 40 preferably is defined by corner 30 of pan 10, and the inner periphery of region 40 is defined by an imaginary line running parallel to corner 30 around the entire circumference of the pan. This imaginary line defining the inner periphery of region 40 is spaced from corner 30 at a preferred distance, or bandwidth, toward region 50 of pan 10. According to a preferred embodiment, the imaginary line is spaced 1.5 inches from corner 30, to define a 1.5 inch bandwidth.

A preferred diameter of pan 10, from the center of the pan along base 13 to corner 30, is 14 inches. Of course, a wide variety of pan diameters are contemplated, both larger and smaller than a 14 inch diameter pan. For each diameter pan, however, the imaginary line defining the inner periphery of region 40 preferably remains at a constant distance from corner 30 of pan 10. For example, for 11 inch pans and 17 inch pans, the imaginary line dividing regions 40 and 45 preferably is spaced 1.5 inches away from corner 30. Of course, depending upon the type of pizza or other food product being cooked, for example, other bandwidths may be more desirable, and such bandwidths are within the scope of the invention.

As clearly shown in the figures, the perforation density of outer region 40 is significantly lower than the perforation density of region 45. Additionally, within each region the perforations are uniformly distributed. Unlike various prior art pizza pans, such as the Power pan identified above, the differentiation of perforation density from band to band results in a more desirable distribution of baking heat throughout the pizza or other food product being prepared.

Figure 6A:
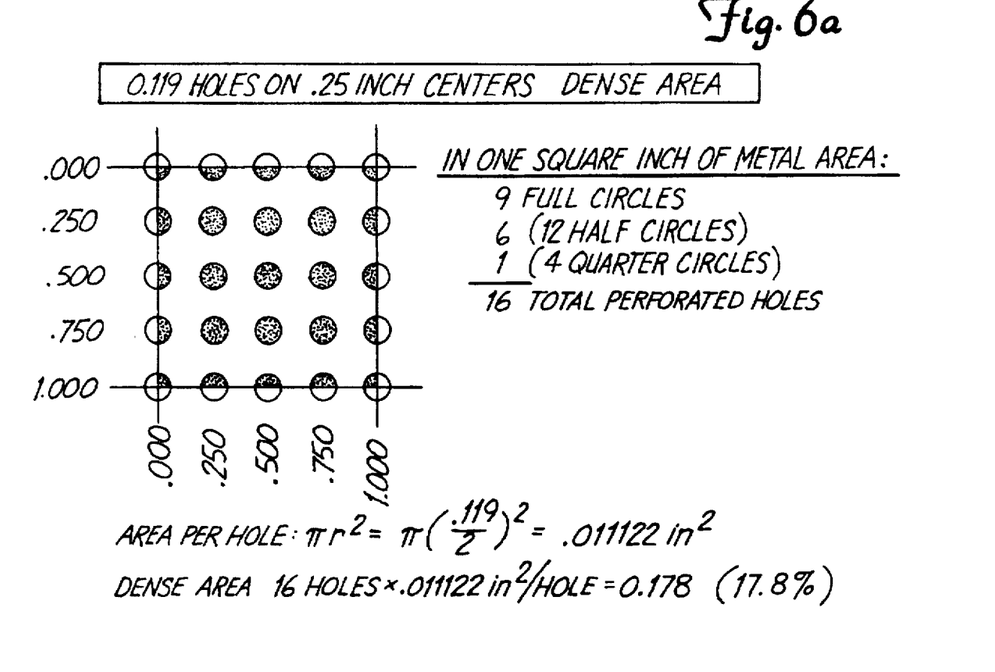
FIGS. 6A–6B are perforation diagrams.
Figure 6B:
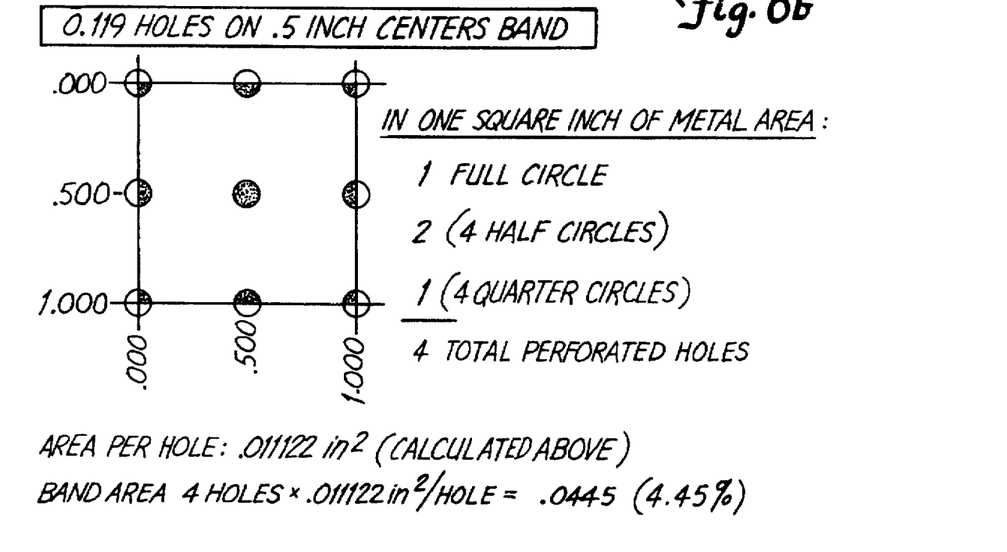

According to a preferred embodiment, outer region 40 has a percentage open area of approximately 4.5 percent, and central region 45 has an open area of approximately 17.8 percent, yielding an average open area of approximately 12.7 percent over the base of a 14 inch bottom diameter pan, as will be described below with reference to FIGS. 6A–6B. The higher perforation density of central region 45 relative to outer region 40 allows more baking heat to be directed toward the center part of the pizza, which typically remains colder for a longer period of time during cooking.

In region 40, according to a preferred embodiment, perforations 43 each are spaced 0.50 inches apart in preferably perpendicular X-Y columns. In region 45, on the other hand, perforations 48 preferably are spaced 0.25 inches apart, also preferably in perpendicular X-Y columns. Perforations 43, 48 are disposed in X-Y columns for purposes of simplifying the tooling necessary to produce pan 10, namely the punches for creating each of the perforations 43, 48, but also could assume other patterns of uniform distribution within each band. Additionally, the spacings between the perforations within in each region can be varied in accordance with the type of pizza or other food product being cooked, for example.

According to a preferred embodiment, each of the perforations has a diameter of approximately 0.119 inches. It has been found that perforations of smaller diameter require extremely small-diameter punches, which are subject to easy breakage. The type of punch press used to create pan 10 would be clear to one of ordinary skill in the art from the disclosure of the pan. Of course, the size of perforations 43, 48, like the relative spacings between perforations 43 in region 40 and perforations 48 in region 45, can be varied as desired to achieve the best result. Additionally, perforations 43, 48 can be of other than circular shape, for example, oval, square or triangular shape.

The perforation densities in regions 45, 40 are carefully chosen to yield a texture that is close to a hearth-baked texture. Spotting and splotchiness on the bottom surface of the pizza dough are significantly reduced, if not entirely eliminated, overcoming a significant disadvantage of prior art pans. Additionally, the dough at the bottom of the pizza is evenly cooked, without the alternating regions of overcooked and undercooked dough characteristic of the perforated pans of the prior art. By creating uniform cooking heat distribution in central region 45 and lower but still uniform cooking heat distribution in outer region 40, the overall uniform texture and appearance of the crust, characteristic of hearth-baked pizza, is produced.

According to a preferred embodiment, rim 20 is formed without any perforations. For certain types of pizza-products, perforations in rim 20 tend to burn the outer edge of the pizza. Solid rims also provide more even air flow around the edge of the pizza in typical impingement-type pizza ovens, and also tend to protect the cheese or other product that is placed within the filled rim. Further, solid rims yield a stronger pan that more easily is pulled out of standard ovens by the gripping-type devices typically used in commercial restaurants. Finally, because during the process of forming certain types of pizza products, such as the filled-rim pizza referenced in the above-identified copending application, the pizza dough is pressed against the rim, rim perforations would cause unsightly deformation of the edge of the pizza.

Additionally, the perforation patterns and densities across regions 40, 45 are chosen to produce uniform cooking results across a wide variety of oven types and cooking environments. As described above, this is especially important to national chain restaurants. The pan according to the invention produces uniformity of result from oven to oven and from restaurant to restaurant, despite the numerous variations in heat controls, air-flow designs and temperature ranges that may be present in different ovens and even within ovens of the same type. This uniformity across a variety of oven types represents a significant advantage over the prior art.

Additionally, perforations 43 of region 40 are disposed so as not to intersect corner 30 of pan 10. This yields a stronger pan that is more easily pulled out of standard ovens by the pan-gripping devices typically used in commercial restaurants. Additionally, the lack of perforations on corner 30 protects the pizza dough from unsightly discoloration, uneven coloring and overbaking at the edge of the pizza.

Pan 10 also includes a score line 35, extending circumferentially around the pan at a selected distance from corner 30. According to a preferred embodiment, score line 35 is spaced approximately one-half inch from corner 30, along the entire circumference of pan 10. Score line 35 is especially useful for aiding in the stuffing of a filled-rim pizza to be cooked using pan 10. As described in the above-referenced copending U.S. patent application, cheese or other material to be disposed within the crust of the pizza product is placed on the dough resting on the base 13 of pan 10. The outer edge of the dough is then folded over the cheese, creating a dough overlap of a preferred width. Score line 35 of pan 10 is used to define the outer edge of the dough, after the dough has been folded over the cheese or other stuffing. Score fine 35 thus acts as a circular guide, facilitating production of a circular crust and thereby improving the overall appearance of the pizza product.

With typical hearth-type baking, the product is baked on a deck oven (stone) that maintains high heat, such as 500 degrees Fahrenheit or higher. Pizza dough with toppings is placed directly on the stone to bake. The surface in contact quickly "sears," or sets a "skin." Free moisture on the surface is driven off, and heat then actively is transferred into the product to increase the internal temperature. This in turn gelatinizes the starch, sets the protein structure, creates steam to expand air cells, and stops yeast and enzyme activity.

The nature of the deck oven creates temperature gradients. There generally is no air flow, contrary to the typical impingement oven. This in turn creates a moisture barrier or insulated area around the pizza. Therefore, while the bottom of the crust continues to heat in the 3–5 minute bake time denaturization begins. Because moisture is not driven off, a gradient is created within the product. When the product is removed from the oven, the bottom crust is initially crisp. But within 3–5 minutes it is tough and leathery due to the continuous moisture migration within the crust.

To overcome this disadvantage of hearth-baked pizza product, pan 10 according to the invention allows for crispness to be created and maintained in the food product to be cooked. In the typical impingement oven, continuously moving air around the product in pan 10 causes moisture to continuously move within the product towards the outside. The product thus is actually "seared" on the bottom as in a typical deck oven, but perforations 43, 48 in pan 10 allow for air circulating around the product to carry off the moisture. Thus, the tough and leathery crust typical of deck-oven baked pizzas is avoided.

According to a preferred embodiment, pan 10 is produced of a 5052 aluminum of thickness approximately 0.063 inches. Although softer aluminum, such as 3003/3004 aluminum, also can be used, softer materials tend to allow rim deformation when the pan is lifted from the oven. Of course, a wide variety of materials are contemplated by the invention, including stainless steel, copper alloys and other materials. The preferred thickness creates a relatively stiff and strong pan that can withstand the stresses typically associated with insertion and removal from ovens, and with physical removal of the pizza from the pan itself, but other thicknesses also are contemplated as needed.

FIGS. 5A–5D show top, first and second detail, and side elevational views, respectively, showing preferred dimensions of the various components. FIGS. 6A–6B show perforation patterns for purposes of calculating preferred hole densities. Dense holes, that is, holes in central region 45, are of density 0.178 in$^2$ OPEN/1 in$^2$ metal space (i.e., 17.8%). Band holes, that is, holes in outer region or band 40, are of density 0.0445 in$^2$ OPEN/1 in$^2$ metal space (i.e., 4.45%). The total area of the preferred embodiment pan's bottom is: 153.94 in$^2$ (Dense area: $\pi r^2 = \pi(11/2)^2 = 95.033$ in$^2$)+(Band area: Outside Diameter area—Dense area=$\pi r^2 - 95.033 = \pi(14/2)^2 - 95.033 = 58.905$ in$^2$). Therefore, the following hold true: Open area (in$^2$):

Dense area: 0.178(17.8%) OPEN×95.033 in$^2$=16.916 in$^2$

Band area: 0.0445 (4.5%) OPEN×58.905 in$^2$=2.621 in$^2$

Total open area: 16.916 in$^2$+2.621=19.537 in$^2$ OPEN

Overall percentage open area: 19.537 in$^2$ OPEN/153.94 in$^2$ total area=12.7% OPEN.

Of course, different calculations would apply to different pan diameters and different perforation diameters.

While the invention has been described with reference to specific embodiments, the description is illustrative and is not to be construed as limiting the scope of the invention. For example, as mentioned throughout the specification, other types of food products advantageously can be cooked using the pan according to the invention, not just pizza-type products. The pan according to the invention also can be used in a wide variety of ovens, formed of a wide variety of materials, and be of a wide range of diameters. Additionally, more than two regions of varying density can be used, and the base of the pan can be formed of a screen with regions of differing aperture density. Various other modifications and changes may occur to those skilled in the art without departing from the spirit and scope of the invention.

What is claimed is:

1. A pan for receiving and baking a food product in a baking oven, the pan producing a desired texture and appearance in the crust of the food product the pan comprising:

(a) a generally planar base having a top surface to receive the food product and a bottom surface to rest on a surface of the baking oven, the base comprising a generally circular shape, the base further comprising structure defining a plurality of perforations extending through the base to allow transmission of baking heat through the base; and (b) a continuous rim extending circumferentially around the base, the rim intersecting the base to form an obtuse angle of intersection with the top surface of the base;

(c) the perforations being formed in first and second perforation regions on the base, the first perforation region extending toward the rim from a central region of the base and terminating at an outer border, the second perforation region extending radially outwardly from the outer border of the first perforation region substantially to the rim of the pan, the perforations of the first perforation region being generally evenly distributed across the entire first perforation region at a first perforation density, the perforations of the second perforation region being generally evenly distributed across the entire second perforation region at a substantially constant second perforation density, the first perforation density being greater than the second perforation density to allow greater transmission of baking heat through the base to the food product in the first perforation region than in the second perforation region;

wherein the width of the second perforation region defines perpendicular X and Y directions, the second perforation region having more than one perforation in each of the X and Y directions.

2. The pan of claim 1, wherein the base defines a surface area, further wherein the first perforation region defines a surface area that is greater than half the surface area of the base.

3. The pan of claim 2, wherein the surface area of the first perforation region is approximately 60% of the surface area of the base, further wherein the second perforation region defines a surface area that is approximately 40% of the surface area of the base.

4. The pan of claim 1, wherein the perforation density of the first perforation region is at least twice the perforation density of the second perforation region.

5. The pan of claim 4, wherein the perforation density of the first perforation region is in the range between about 12% and about 22%, further wherein the perforation density of the second perforation region is in the range between about 2% and about 6%.

6. The pan of claim 4, wherein the base defines a diameter, further wherein the outer border of the first perforation region is spaced from the center of the base by a distance that is about 85%–90% the diameter.

7. The pan of claim 4, wherein the outer border of the first perforation region is spaced from the rim by about 1.5 inches.

8. The pan of claim 1, wherein the perforation density of the first perforation region is about 17.8%, further wherein the perforation density of the second perforation region is about 4.5%.

9. The pan of claim 1, wherein the second perforation region extends radially outwardly to the rim of the pan.

10. The pan of claim 1, wherein the perforations direct moisture away from the food product.

11. The pan of claim 1, further comprising a third perforation region of different perforation density than the first and second perforation regions.

12. The pan of claim 1, wherein the perforations of the second perforation region are disposed in X and Y columns, each X column having more than one perforation therein and each Y column having more than one perforation therein, the width of the second perforation region being of more than one adjacent column of perforations.

13. A pizza pan for receiving and baking a pizza in a baking oven, the pan producing a hearth-baked-type texture and appearance in the crust of the pizza, the pizza pan comprising:

(a) a generally planar, continuous base having a top surface to receive the pizza and a bottom surface to rest on a surface of the baking oven, the base comprising a circular shape, the base further including structure defining a plurality of perforations of similar geometric shape, the perforations being disposed through the base in X-Y columns to allow transmission of baking heat through the base; and (b) a continuous rim extending circumferentially around the base in its entirety;

(c) the perforations being formed in first and second perforation regions on the base, the first and second perforation regions together covering at least the majority of the base, the perforations of the first perforation region being distributed generally uniformly within the first perforation region and the perforations of the second perforation region being distributed generally uniformly at a substantially constant perforation density within the second perforation region, the first perforation region defining a generally circular shape having an outer perimeter and the second perforation region generally defining a ring, the second perforation region surrounding the first perforation region, the second perforation region being surrounded by the rim;

(d) the perforations of the first perforation region having a separation distance between adjacent perforations along each X column and having a separation distance between adjacent perforations along each Y column, the separation distance between adjacent perforations of the first perforation region along each X column being identical to the separation distance between adjacent perforations of the first perforation region along each Y column;

(e) the perforations of the second perforation region having a separation distance between adjacent perforations along each X column and having a separation distance between adjacent perforations along each Y column, the separation distance between adjacent perforations of the second perforation region along each X column being identical to the separation distance between adjacent perforations of the second perforation region along each Y column, the separation between adjacent perforations of the second perforation region being greater than the separation between adjacent perforations of the first perforation region such that the base transmits greater baking heat through the first perforation region than through the second perforation region;

wherein the width of the second perforation region:
extends substantially from the outer perimeter of the first perforation region to the rim of the pan;
has more than one perforation in each X column and in each Y column; and
is of more than one adjacent column of perforations.

14. The pizza pan of claim 13, wherein the rim intersects the base to form a distinct, obtuse angle of intersection with the top surface of the base.

15. The pizza pan of claim 13, wherein the rim is non-perforated.

16. The pizza pan of claim 13, wherein the X-Y perforation columns of the second perforation region are aligned with the X-Y perforation columns of the first perforation region.

17. The pizza pan of claim 13, wherein the separation between adjacent perforations of the second perforation region is twice the separation between adjacent perforations of the first perforation region.

18. The pizza pan of claim 13, wherein the perforations of the first perforation region together form a substantially octagonal shape.

19. The pizza pan of claim 13, wherein the perforations are identical circular perforations.

* * * * *